United States Patent [19]
Araki et al.

[11] Patent Number: 5,709,364
[45] Date of Patent: Jan. 20, 1998

[54] POWER SEAT ADJUSTING APPARATUS

[75] Inventors: Noriyuki Araki, Minokamo; Norimasa Kitoh, Inuyama; Hiroaki Banno, Ichinomiya; Masashi Mitsukuchi, Kohnan; Akinori Mori, Komaki, all of Japan

[73] Assignee: Kabushiki Kaisha Imasen Denki Seisakusho, Inuyama, Japan

[21] Appl. No.: 679,906

[22] Filed: Jul. 15, 1996

[30] Foreign Application Priority Data

Jul. 28, 1995 [JP] Japan ................. 7-192717

[51] Int. Cl.$^6$ ................................. F16M 13/00
[52] U.S. Cl. ................. 248/421; 248/157; 248/419; 297/344.15; 297/344.17
[58] Field of Search ............... 248/157, 419, 248/421; 297/344.15, 344.17

[56] References Cited

U.S. PATENT DOCUMENTS 3,223,377  12/1965  Robbins ................. 248/419
4,648,575   3/1987  Kawade ................. 248/421 X Primary Examiner—Alvin C. Chin-Shue
Assistant Examiner—Long Dinh Phan
Attorney, Agent, or Firm—Jacobson, Price, Holman & Stern, PLLC

[57] ABSTRACT

Output reduced by a reduction mechanism A contained within a tube type motor body 5 is transmitted to a threaded shaft 13, and a nut 15 having a wing element 15a for transforming rotation of the threaded shaft 13 to propulsion is threadingly engaged with the threaded shaft 13. Then, reduction and boost is made between a linear groove 16a of a guide member 16 secured to an inner wall of the body 5 and the rotation is transmitted to the body 5 by this rotational force, thereby an arm 17 provided on the body 5 is swung so that a base 3 is adjusted upwardly and downwardly about bearing members 2, 2a mounted on slide rails 1, 1. Owing to this arrangement, since a smaller installation space can be achieved, the apparatus can be made small in size and commonly used for various types of automotive vehicles. Moreover, the apparatus can be unitized. In addition, a high torque transmission is made possible by reduction and boost.

3 Claims, 9 Drawing Sheets

1

POWER SEAT ADJUSTING APPARATUS

BACKGROUND OF THE INVENTION

This invention relates to a seat adjuster or seat adjusting apparatus for automobiles and the like.

BRIEF DESCRIPTION OF THE PRIOR ART

Power height apparatuses for adjusting a vertical position of a vehicle seat cushion, power reclining apparatuses for adjusting the inclination of a seat-back, etc. have heretofore been known as a power seat apparatus in automotive vehicles. Also, another type of apparatuses have been known as the above-mentioned power seat apparatus, in which tubular members serve as connecting strength members disposed laterally opposite sides of the seat and also as a power transmission function. Still known are apparatuses in which output of a motor is reduced and boosted, and then the power is transmitted to the tubes to rotate the tubes themselves so that the seat on the base is driven upwardly and downwardly by an arm secured to each tube.

However, since the conventional apparatus in which the tubular members serve as connecting strength members disposed laterally opposite sides of the seat and also as a power transmission function has a large reduction gear, it is difficult to arrange the height apparatus between the limited space between the seat cushion and the vehicle body. Furthermore, depending on the types of the vehicles, the mechanism is sometimes difficult to be unitized and commonly used.

The present invention has been accomplished in order to obviate the above-mentioned shortcomings inherent in the conventional power seat adjusting apparatus.

It is, therefore, a general object of the present invention to provide a power seat adjusting apparatus which is compact in size and can be commonly used irrespective of the types of vehicles.

In order to achieve the above object, there is essentially provided a power seat adjusting apparatus comprising a tube type motor body having a yoke formed of a tubular member, output from a motor being reduced and boosted to transmit its power to the tube type motor body so that the motor body itself is rotated, a base with a seat placed thereon being driven upwardly and downwardly by an arm secured to the tube type motor body, wherein rotational force of the output is transformed into propulsion by a wing element provided on a nut which is threadingly engaged with a feed thread mechanism and then reduced and boosted between a spiral groove and a linear groove formed within the body, so that the rotational force is transmitted to the tube type motor body.

2

Figure 3:
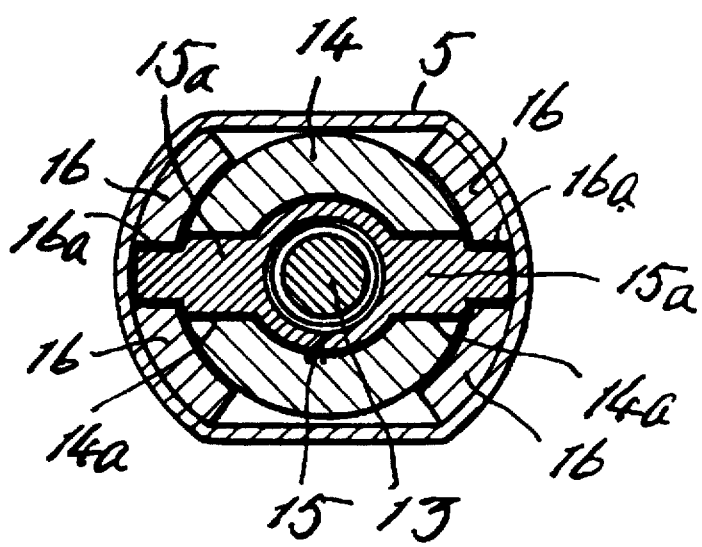
FIG. 3 is an enlarged vertical sectional view taken on line 3—3 of FIG. 2.
Figure 4:
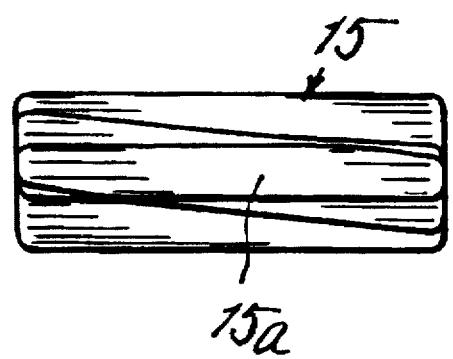
FIG. 4 is a side view of a nut threadingly engageable with a threaded shaft of FIG. 2.
Figure 5:
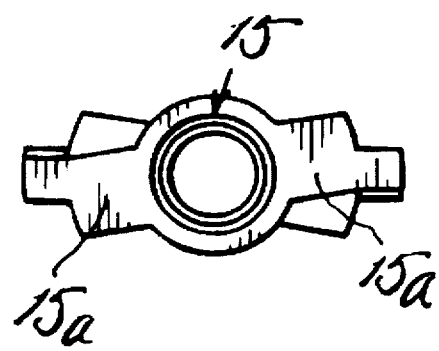
FIG. 5 is a front view of the nut.
Figure 6:
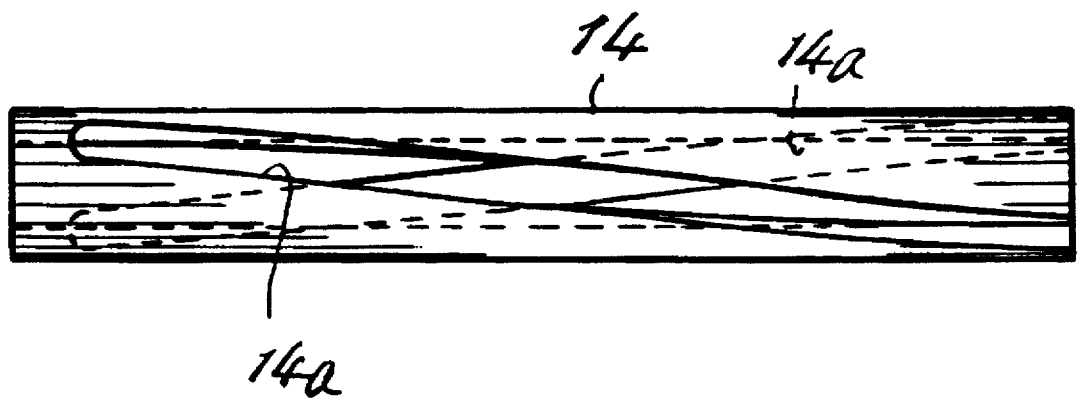
FIG. 6 is a side view showing a part of a fixing tube provided with a spiral groove shown in FIG. 2.
Figure 7:
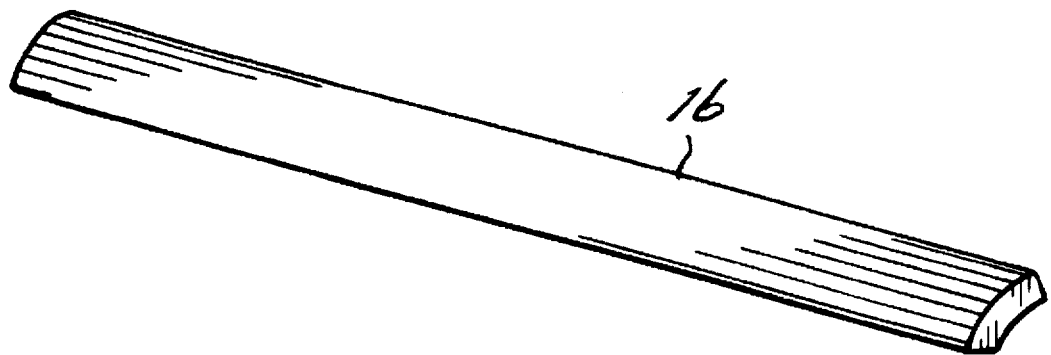
Figure 8:
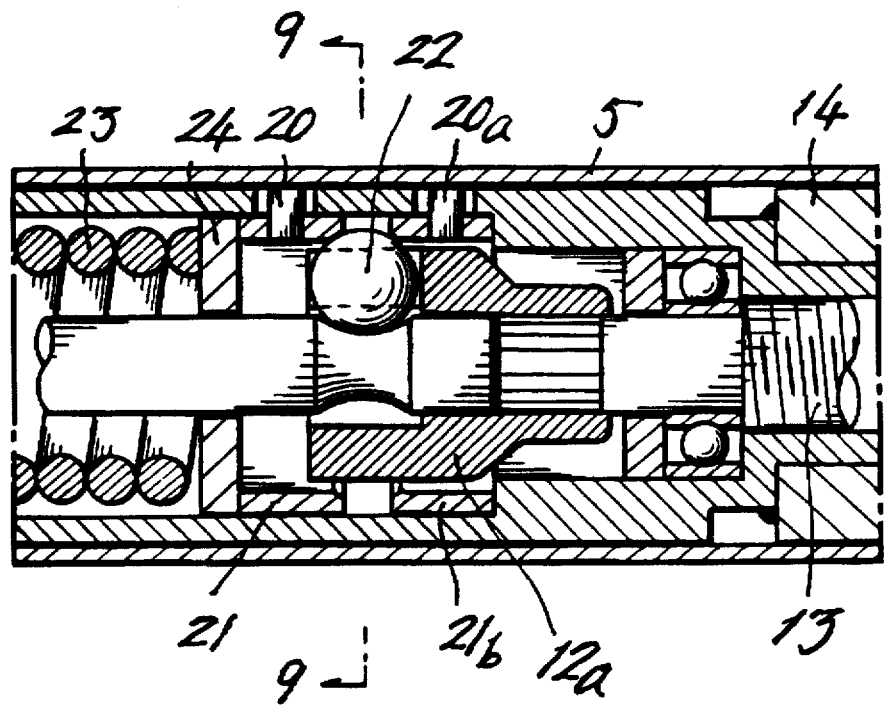
Figure 9:
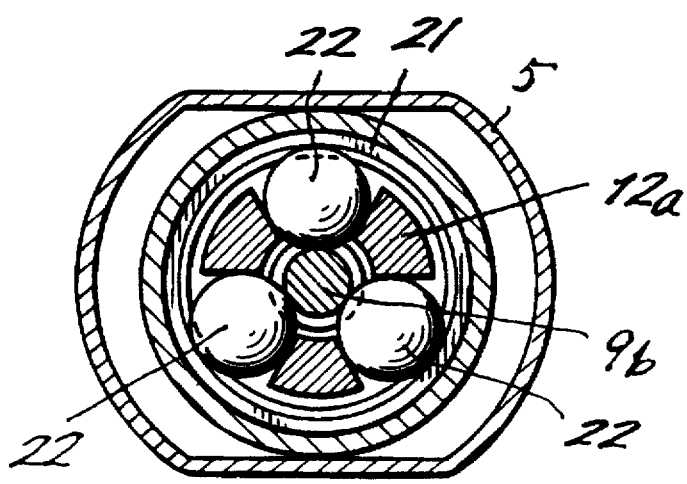
Figure 10:
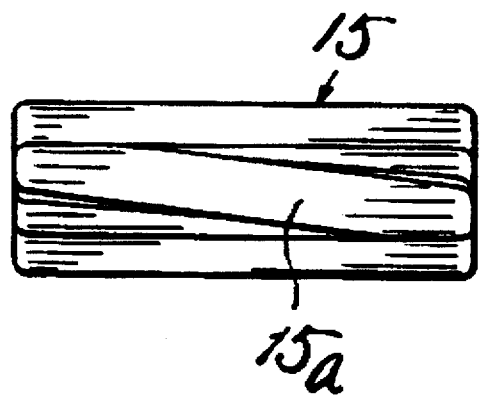
Figure 11:
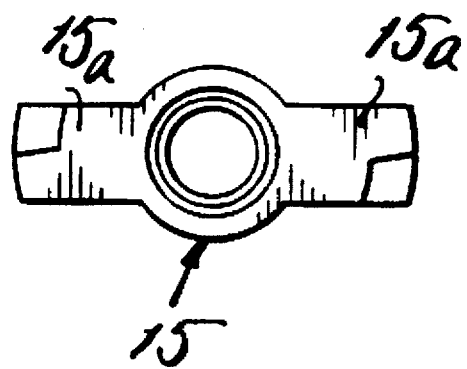
Figure 12:
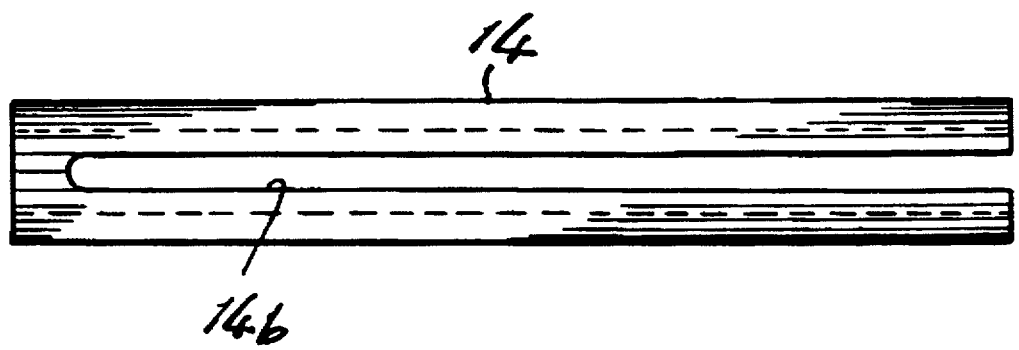
Figure 13:
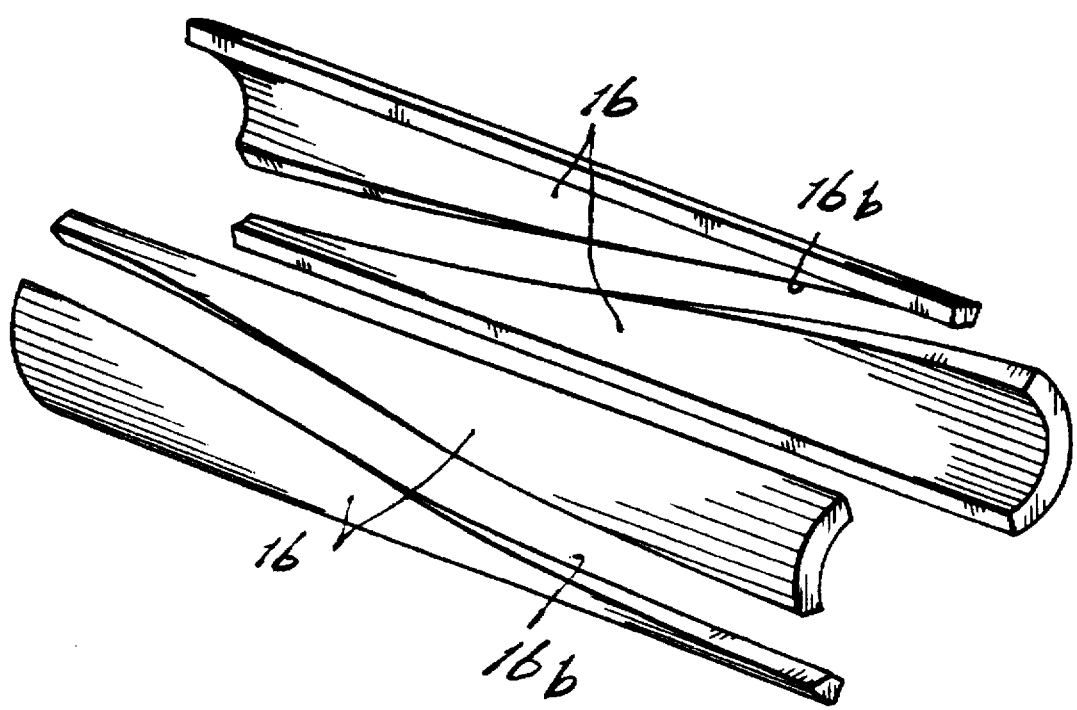
Figure 14:
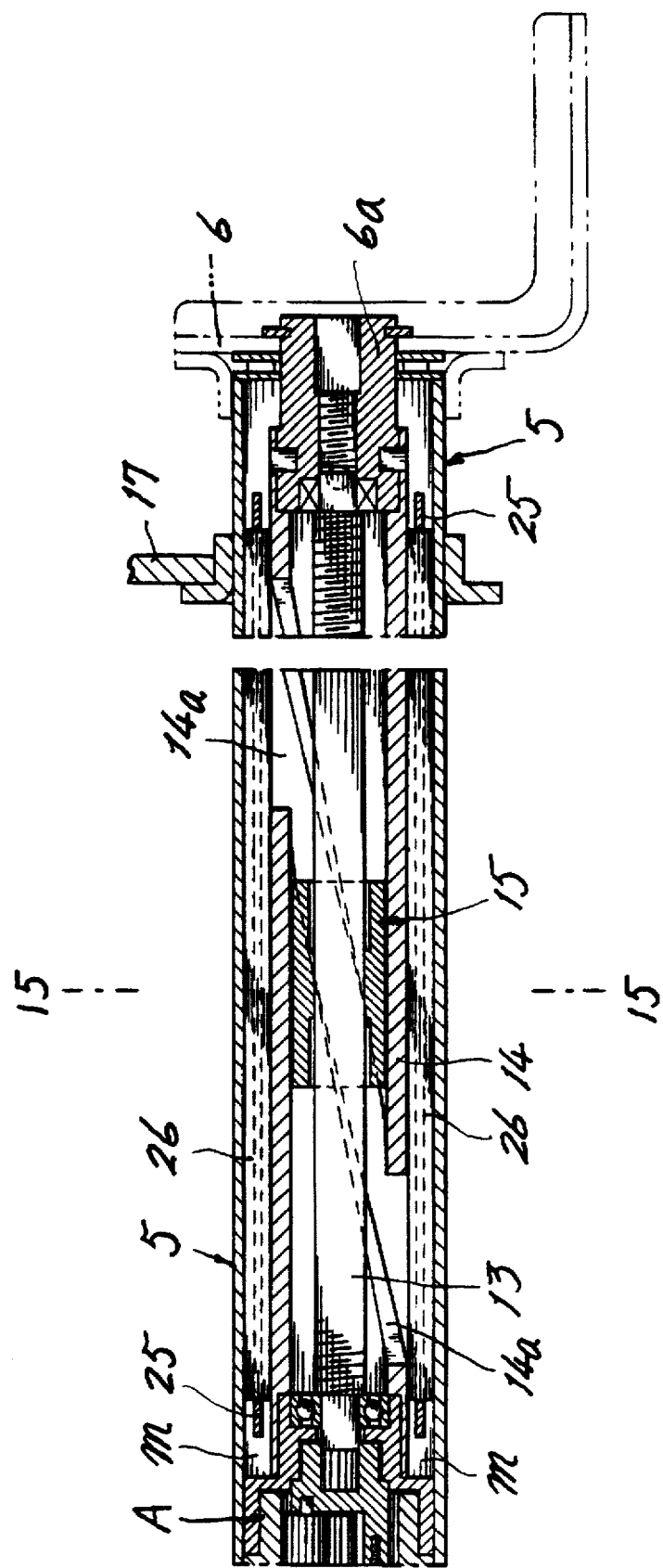
Figure 15:
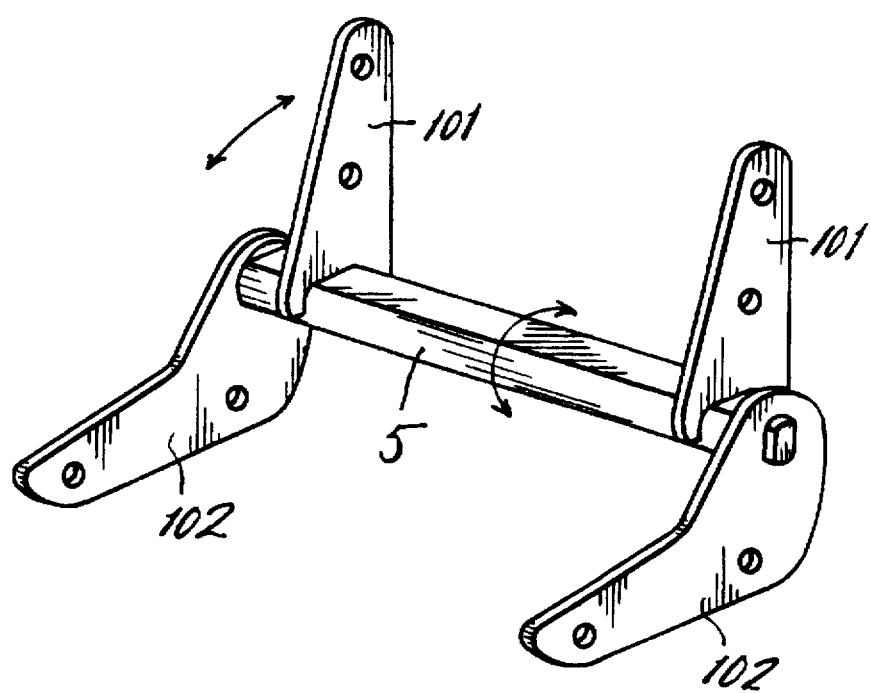

FIG. 7 is a perspective view showing one of guide members which constitute the linear groove shown in FIG. 3;

FIG. 8 is a sectional view showing a reduction mechanism having a friction type planetary gear construction;

FIG. 9 is a vertical sectional view taken on line 9—9 of FIG. 8;

FIG. 10 is a side view of a nut threadingly engageable with a threaded shaft;

FIG. 11 is a front view of the nut of FIG. 10;

FIG. 12 is a side view of the fixing tube provided with a linear groove;

FIG. 13 is an exploded perspective view of the guide member which constitutes the spiral groove;

FIG. 14 is a sectional view in which a needle pin retained on a retainer is disposed in a gap between the fixing tube provided with the linear or spiral groove and the tube type motor body having the guide portion;

FIG. 15 is a vertical sectional view taken on line 15—15 of FIG. 14; and

Figure 16:
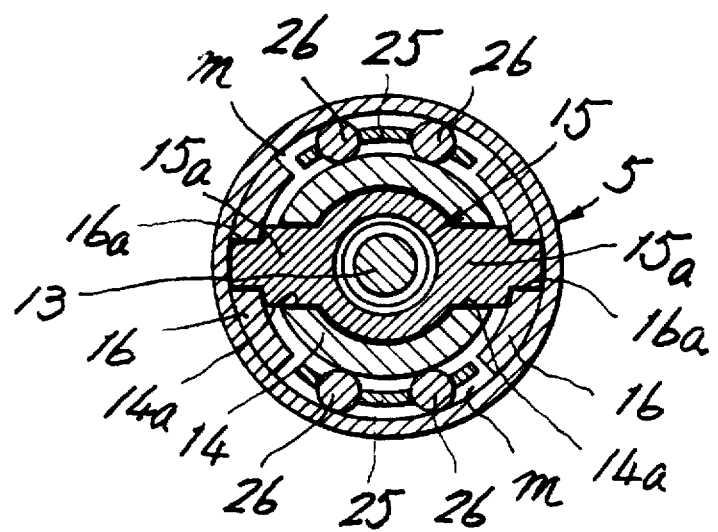

FIG. 16 is a perspective view in which the tube type motor body is employed in a reclining apparatus.

BEST MODE FOR CARRYING OUT THE INVENTION

The features and advantages of the present invention will now be described by way of one preferred embodiment with reference to the accompanying drawings.

The embodiment shown in FIGS. 1 through 7 will be described first with reference to a power height apparatus.

Figure 1:
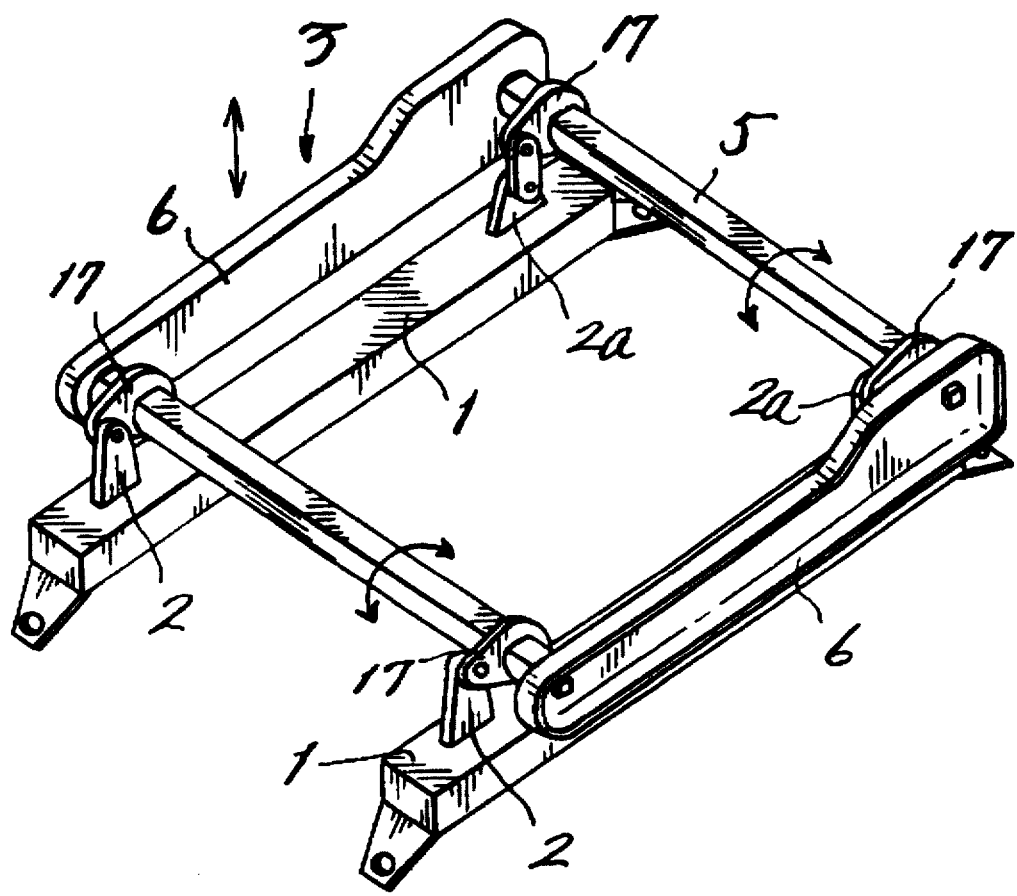
FIG. 1 is a perspective view of a power height apparatus for a power seat adjusting apparatus according to one embodiment of the present invention.

In FIG. 1, reference numeral 1 denotes a pair of slide rails which are disposed on the floor spacedly and in parallel relation. Two pairs of bearing members 2, 2, 2a, 2a are fixedly arranged on a forward and a rearward location on the slide rails 1, 1, respectively.

Figure 2:
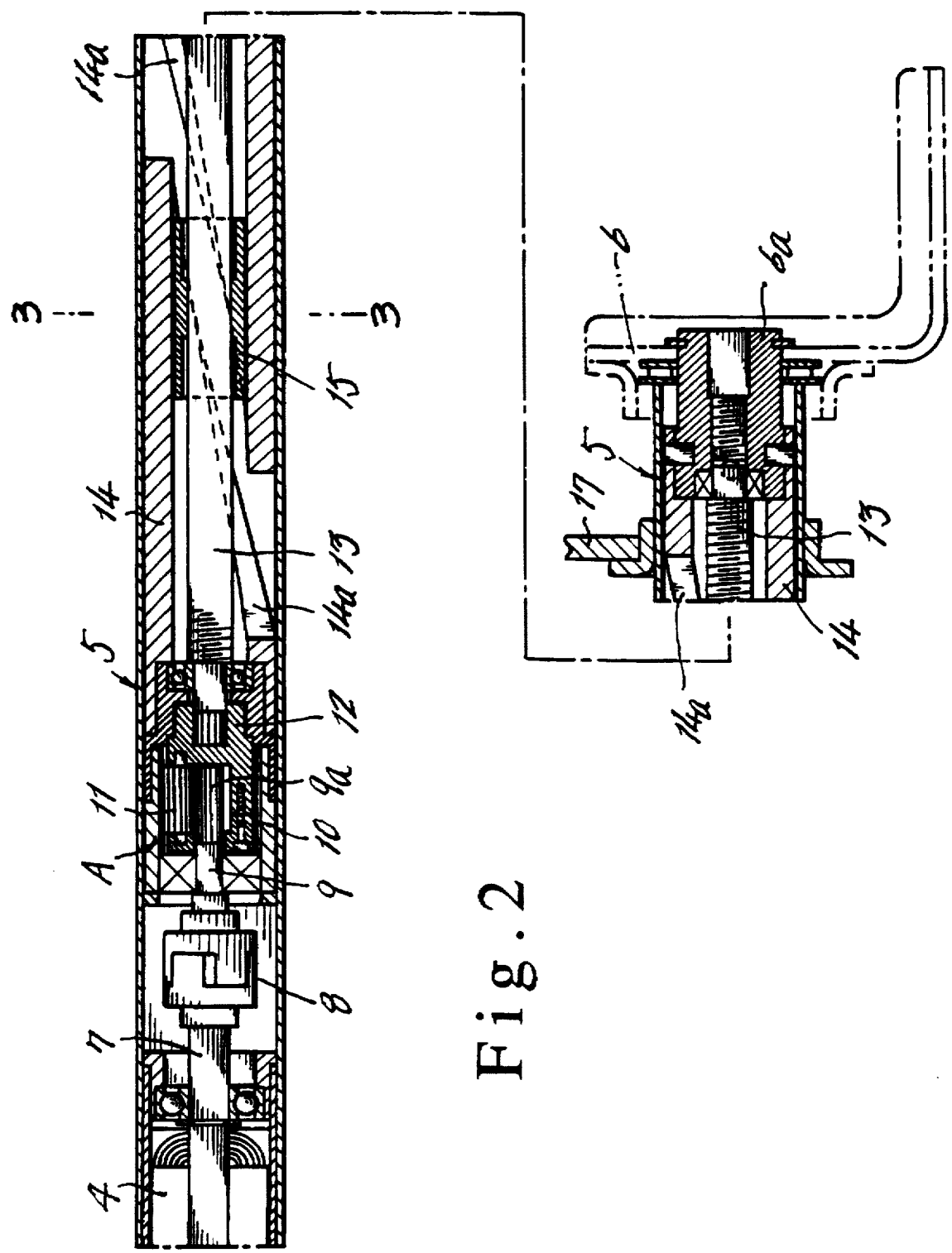
FIG. 2 is a sectional view showing a part of a tube type motor body.

Reference numeral 3 denotes a base. The base 3 comprises a tube type motor body 5 containing therein a motor 4 as shown in FIG. 2, and a pair of brackets 6, 6 for connecting end portions of the motor body 5 through a bearing portion 6a.

An output shaft 7 extending from the motor 4 which is contained in the tube type motor body 5 which constitutes the base 3 is connected to a shaft 9 having a sun gear 9a of a coaxial reduction gear unit A through a coupling 8, and the sun gear 9a is meshed with an inner gear 10 fixed within the body 5 through a planetary gear 11, thereby constituting the reduction gear mechanism A by this planetary gear system. A support member 12 for supporting the planetary gear 11 is attached to one end of a threaded shaft 13 which is carried on a bearing coaxially with the shaft 9 having the sun gear 9a within the body 5. The output from the reduction mechanism A is transmitted to the threaded shaft 13 after it is reduced and boosted.

The threaded shaft 13 is formed as a trapezoidal spring. This threaded shaft 13 is threadingly engaged with a nut 15 fitted to a spiral groove 14a formed in a fixing tube 14.

The nut 15 has a pair of wing elements 15a, 15b expanded sidewardly so as to be slidingly fitted into the spiral groove 14a. A linear groove 16a formed in a guide member 16 which is secured to an inner wall of the tube type motor body 5 is slidingly fitted to a distal end portion of each wing element 15a. Accordingly, rotation is transmitted to the guide member 16 by propulsion caused by the rotation of the threaded shaft 13. This rotation is further transmitted the tube type motor body 5 for securing the guide member 16.

One end of an arm 17 is attached to an external side of the tube type motor body 5. A distal end of this arm 17 is pivotally connected to the bearing members 2 mounted on the slide rails 1, 1. For applying an upward and downward motion to the base 3 with the seat placed thereon, and the motor 4 contained within the body 5 is actuated, the output shaft 7 is connected to the shaft 9 having the sun gear 9a through the coupling 8 so that rotation of the output shaft 7 is transmitted to the shaft 9. On the other hand, the rotation, which is reduced and boosted through the sun gear 9a and the planetary gear 11 meshed with an inner gear 10, is transmitted to the threaded shaft 13, then propulsion is transmitted to the nut 15 which is threadingly engaged with the threaded shaft 13, and the wing element 15a provided on the nut 15 is reduced along the spiral groove 14a formed in the fixing tube 14 by the propulsion of the nut 15 and slowly rotated. At that time, the distal end of the wing element 15a is slidingly fitted into the linear groove 16a of the guide member 16 which is secured the inner wall of the body 5 with the nut 15 threadingly engaged with the threaded shaft 13. The wing element 15a is rotated by rotation of the nut 15 which is caused by the spiral groove 14a of the fixing tube 14 and causes the body 5 likewise to rotate. The body 5 thus rotated causes the arm 17 to swing thereby to move the base 3 upwardly and downwardly about the bearing members 2, 2a. That is, the employment of the tube type motor constituting the reduction mechanism, the feed mechanism and the rotational mechanism within the tube type motor body makes it possible to achieve a smaller installation space, thereby achieving a smaller sized design of the apparatus. Moreover, the apparatus can be commonly used for various types of automotive vehicles and unitized.

FIGS. 8 through 13 show another embodiment of a reduction mechanism and a rotational mechanism. A reduction mechanism of FIGS. 8 and 9 uses a friction type planetary mechanism instead of the planetary gear of the first embodiment in order to achieve reduction of noises, a smaller sized design and high output transmission. This will be described more specifically.

As in the case with the first embodiment, the output shaft 7 extending from the motor 4 contained in the tube type motor body 5 is connected to the shaft 9 provided with a coaxial sun roller 9b through the coupling 8.

This sun roller 9b of the shaft 9 has a plurality of steel balls 22 rotatably interposed between sliding rings 21, 21a slidably connected to the inner side of the fixing tube 14 through pins 20, 20a.

The plurality of steel balls 22 are held by a holder 12a which is connected to one end of a threaded shaft 13 carried by the fixing tube 14.

The ring 21, among the rings 21, 21a, is pressurized by one end of a spring 23 through a pressure plate 24, the other end of which spring 23 is received in the fixing tube 14 and provides a preliminary pressure to the ring 21 to urge the steel balls 22 towards the sun roller 9b by the rings 21, 21a for the purpose of rendering a frictional force, so that the rotation of the shaft 9 is transmitted to the holder 12a through the steel balls 12 and further to the threaded shaft 13.

In the rotational mechanism, the wing element 15a expanding from the nut 15 which is threadingly engaged with the threaded shaft 13 for movement is slidingly fitted to the linear groove 14b formed in the fixing tube 14, and a threaded portion formed at a distal end side of the wing element 15a is slidingly fitted into the spiral groove 16b formed in the guide member 16 secured to the inner wall of the tube type motor body 5. Accordingly, rotational force is generated between the fixing tube 14 and the guide member 16 by propulsion force of the nut 15 by the threaded shaft 13. Then, this rotational force is transmitted to the tube type motor body 5 through the guide member 16.

One end of the arm 17 is attached, as in the case with the first embodiment, to the external side of the tube type motor body 5, and the distal end of the arm 17 is pivotally connected to the distal end of the bearing member 2 disposed on the slide rails 1, 1, so that the base 3 with the seat placed thereon is moved upwardly and downwardly by rotation of the body 5.

In FIGS. 14 and 15, the threaded shaft 13 formed of a trapezoidal thread for receiving output from the reduction mechanism A within the tube type motor body 5 in a speed reduced and a rotation reduced/boosted manner is threadingly engaged with a nut 15 provided with the wing elements 15a fitted to the fixing tube 14 as in the case with the first embodiment. The distal end portions of the wing elements 15a, 15a of the nut 15 are slidingly fitted in the linear groove 16a formed in the guide member 16 which is secured to the inner wall of the body 5, thereby to render rotation to the guide member 16 through the wing element 15a while slidingly moving the spiral groove 14a by propulsion which is caused by rotation of the threaded shaft 13 and further to the body through the guide member 16.

A gap m generated between the body 5 and the fixing tube 14 tends to produce play or chattering because of the following reason. That is, the reduction/booster caused by the reduction mechanism A provides rotational force to the threaded shaft 13 in order to transmit propulsion to the nut 15. The nut 15 causes the body 5 to rotate by interaction between the spiral groove 14a and the linear groove 16a and then causes the arm 17 secured to the body 5 to rotate, thereby to drive the seat upwardly and downwardly. When an external force is applied, it acts in the opening direction of the spiral groove 14a or the linear groove 16a and is deflected by a portion corresponding to the gap m, thereby generating a play or chattering. Accordingly, the needle pin 26 held by the retainer 25 is inserted in this gap m in order to suppressing an amount of deflection which tends to cause play or chattering.

FIG. 17 shows still another embodiment in which the tube type motor body 5 is employed into a reclining seat.

In this embodiment, the tube type motor body 5 is rotated by rotational force obtained by reducing and boosting the propulsion from the reduction mechanism A caused by the feed threaded shaft 13, through the linear groove 16a and the spiral groove 14a, so that a movable bracket 101 mounted on a back support which is attached to the outer periphery of the tube type motor body 5 is rotated about a fixed bracket 102 of the reclining apparatus, thus enabling to adjust the angle.

While some preferred embodiments of a power seat adjusting apparatus according to the present invention have thus far been described with reference to the accompanying drawings, it should be borne in mind that such embodiments are merely illustrative of the gist of the present invention and are accordingly subject to modification and change.

What is claimed is:

1. A power seat adjusting apparatus comprising a tube type motor body having a yoke formed of a tubular member, output from a motor being reduced and boosted to transmit its power to said tube type motor body so that said motor body itself is rotated, a base with a seat placed thereon being driven upwardly and downwardly by an arm secured to said tube type motor body, wherein rotational force of the output is transformed into propulsion by a wing element provided on a nut which is threadingly engaged with a feed thread mechanism and then reduced and boosted between a spiral groove and a linear groove formed within said body, so that the rotational force is transmitted to said tube type motor body.

2. A power seat adjusting apparatus according to claim 1, wherein a reduction mechanism contained within said tubular body employs a friction type planetary mechanism comprising a sun roller, a steel ball and a spring for preliminarily pressing a ring and another ring.

3. A power seat adjusting apparatus according to claim 1, wherein a needle pin retained by a retainer is disposed in a gap between a fixing tube and said tube type motor body so that an amount of deflection is suppressed.

* * * * *